United States Patent
Pilney et al.

(10) Patent No.: US 12,302,893 B2
(45) Date of Patent: May 20, 2025

(54) SPRAYER BOOM BREAKAWAY JOINT WITH A STAGED RELEASE AND FORCED LIFT SYSTEM

(71) Applicant: CNH Industrial America LLC, New Holland, PA (US)

(72) Inventors: Brian J. Pilney, West Bend, WI (US); Derrick Fallon, Manitowoc, WI (US)

( * ) Notice: Subject to any disclaimer, the term of this patent is extended or adjusted under 35 U.S.C. 154(b) by 0 days.

(21) Appl. No.: 17/568,127

(22) Filed: Jan. 4, 2022

(65) Prior Publication Data
US 2022/0125031 A1    Apr. 28, 2022

Related U.S. Application Data

(63) Continuation of application No. 16/293,928, filed on Mar. 6, 2019, now Pat. No. 11,224,211.

(51) Int. Cl.
| | |
|---|---|
| *A01M 7/00* | (2006.01) |
| *B05B 1/20* | (2006.01) |
| *F16C 11/12* | (2006.01) |

(52) U.S. Cl.
CPC ............ *A01M 7/0078* (2013.01); *B05B 1/20* (2013.01); *F16C 11/12* (2013.01)

(58) Field of Classification Search
CPC ........ A01M 7/0078; F16C 11/12; B05B 1/20; B05B 13/005; B05B 15/14; A01C 23/008
USPC .................................................. 239/166–168
See application file for complete search history.

(56) References Cited

U.S. PATENT DOCUMENTS

| | | | |
|---|---|---|---|
| 1,637,520 A | 8/1927 | Dodge | |
| 2,564,041 A | 8/1951 | Vogel | |
| 3,972,476 A * | 8/1976 | Hall | A01M 7/0053 |
| | | | 56/10.4 |
| 4,183,687 A | 1/1980 | Bramwell | |
| 4,634,051 A * | 1/1987 | Dudley | A01M 7/0078 |
| | | | 239/168 |
| 4,787,121 A | 11/1988 | Recenis et al. | |
| 7,854,271 B2 | 12/2010 | Naylor et al. | |
| 8,011,439 B2 | 9/2011 | Gadzella et al. | |
| 8,506,142 B2 | 8/2013 | Macke | |
| 9,265,243 B2 | 2/2016 | Kuphal | |
| 9,408,379 B2 | 8/2016 | Kuphal | |
| 10,004,172 B2 | 6/2018 | Steinlage et al. | |
| 2013/0055640 A1* | 3/2013 | Deitchman | E01F 13/06 |
| | | | 248/560 |
| 2015/0098753 A1* | 4/2015 | Kuphal | A01C 23/008 |
| | | | 403/83 |
| 2016/0316737 A1* | 11/2016 | Pilney | A01M 7/0053 |
| 2017/0367315 A1* | 12/2017 | Bouten | A01M 7/0078 |

(Continued)

*Primary Examiner* — Cody J Lieuwen
(74) *Attorney, Agent, or Firm* — Rebecca Henkel; Rickard K. DeMille; Peter K. Zacharias

(57) ABSTRACT

A sprayer boom breakaway joint with a staged release and forced lift system is implemented with an agricultural sprayer. The system provides positive locking to restrain a breakaway joint against movement from a neutral position until an impact with a breakaway boom segment provides sufficient force to overcome the neutral holding force. Once released from the neutral position, the breakaway boom segment may at least initially experience a lesser holding force that biases the breakaway boom segment toward the neutral position and the breakaway boom segment may move along a path that has an upward movement component in addition to a rearward movement component.

7 Claims, 9 Drawing Sheets

(56) References Cited

U.S. PATENT DOCUMENTS

2018/0087565 A1 3/2018 Tortorella et al.
2018/0184638 A1 7/2018 Parling

* cited by examiner

SPRAYER BOOM BREAKAWAY JOINT WITH A STAGED RELEASE AND FORCED LIFT SYSTEM

CROSS-REFERENCE TO RELATED APPLICATIONS

This application is a continuation of and claims the benefit of priority of U.S. patent application Ser. No. 16/293,928, filed on Mar. 6, 2019, the disclosure of which is hereby incorporated by reference herein in its entirety for all purposes.

FIELD OF THE INVENTION

The invention relates generally to agricultural product application equipment such as self-propelled sprayers and, in particular, to a sprayer boom breakaway joint with a staged release and forced lift system for a sprayer.

BACKGROUND OF THE INVENTION

Sprayer boom lengths of self-propelled sprayers are increasing over time to allow increased coverage in a single spraying pass. Tip ends of the longer booms can contact obstacles such as posts or the ground at times due to, for example, ground height inconsistencies along the length of the boom and tilting of the boom or bending along its length that can be exaggerated during tilting, rolling, or other dynamic movement(s) of the sprayer. It is known to integrate breakaway joints into such longer booms to prevent boom damage during such contacts or impacts by allowing breakaway boom segments at the ends of the booms to pivot away from points of impact. Breakaway joints move through a restricted movement path, typically in a single plane about a hinge axis. The restricted movement paths of breakaway boom segments may not align with a direction of contact, which makes the breakaway movement less effective at reducing the impact-induced stresses. Attempts have been made to implement multi-axis breakaway joints, which provide an additional degree(s) of freedom to improve the ability of the breakaway boom segments to move in a direction that relieves impact-induced stresses. However, implementing plumbing of a wet boom in a manner that can accommodate all the possible movements of multi-axis breakaway joints without damaging the wet boom components is challenging. Many breakaway joint systems have return mechanisms with numerous components including springs, cables, and others. These configurations add complexity and weight to the boom system, which can reduce the use life of main and intermediate boom segments by requiring them to support the additional weight. Typical breakaway joints bias breakaway boom segments to a neutral position without providing any positive locking at a neutral position, allowing some movement through the breakaway joints during normal sprayer travel, especially during acceleration and deceleration. This can compromise spray characteristics at the breakaway boom segment, transfer vibrations, or impart movement through the rest of the boom, and increase wear at the breakaway joints through their frequent articulation. The neutral biasing without positive locking can also allow movement of the breakaway boom segment during boom folding to prepare for a transport mode. This can allow the breakaway boom segment to collide with other sections of the boom while folding. Furthermore, although both single plane and multi-axis breakaway joints allow breakaway boom segments to move away from impacts, during ground contact events, the restorative force of known breakaway systems tends to pull the breakaway boom segments into the ground, which creates a plowing effect that can damage crops and/or the breakaway boom segments.

SUMMARY OF THE INVENTION

A sprayer boom breakaway joint with a staged release and forced lift system is implemented with an agricultural sprayer, such as a self-propelled agricultural sprayer. The system provides positive locking to restrain breakaway joints against movement from a neutral position until an impact with a breakaway boom segment provides sufficient force to overcome the neutral holding force. Once released from the neutral position, the breakaway boom segment may at least initially experience a lesser holding force that biases the breakaway boom segment toward the neutral position. In this way, a breakaway event may ensure that the breakaway boom segment moves away from an impact instead of simply dragging past or over the obstacle or ground since the momentum from the breakaway boom segment's initial release may be sufficient to further move it at least some distance away from the neutral position. Along with pivoting rearwardly, the breakaway boom segment may be lifted upwardly during a breakaway event. The breakaway boom segment may pivot along an angular path that has both a rearward and upward component to its movement that raises the breakaway boom segment every time it moves rearward. While pivoting back and upwardly, the breakaway boom segment may also raise coaxially or longitudinally along the pivot axis to provide additional lift to the breakaway boom segment during the breakaway event.

According to another aspect of the invention, an agricultural sprayer's boom has a first boom segment, a second or breakaway boom segment outward of the first boom segment, and a breakaway joint between the first and breakaway boom segments. A staged release and forced lift system includes a breakaway hinge assembly configured to allow the breakaway boom segment to move with respect to the first boom segment during a breakaway event. The breakaway hinge assembly has an inner bracket connected to the first boom segment and an outer bracket connected to the breakaway boom segment. A hinge pin connects the inner and outer brackets and defines a pivot axis about which the breakaway boom segment pivots with respect to the first boom segment. A staged release mechanism may hold the breakaway boom segment in a neutral position before the breakaway event. A forced lift mechanism may cooperate with the breakaway hinge assembly to lift the outer bracket and the breakaway boom segment while the breakaway boom segment pivots with respect to the first boom segment during the breakaway event.

According to another aspect of the invention, the forced lift mechanism may include a ramp that cooperates with a deflector to lift the outer bracket and the breakaway boom segment while the breakaway boom segment pivots with respect to the first boom segment during the breakaway event. The ramp and deflector may engage each other at a first position relative to the ramp to hold the ramp and the outer bracket in a stable neutral position when the breakaway boom segment is not experiencing a breakaway event. The ramp and deflector may engage each other at variable positions relative to the ramp while the outer bracket pivots to lift the outer bracket and the breakaway boom segment, while the breakaway boom segment is experiencing a breakaway event.

According to another aspect of the invention, the deflector may include a wheel. The wheel has an outer surface that may engage the ramp to lift the outer bracket and the breakaway boom while the breakaway boom segment pivots with respect to the first boom segment during the breakaway event. The wheel may be mounted at a constant height with respect to the inner bracket. The ramp may be mounted at a variable height with respect to the inner bracket and the ramp may rotate across and be lifted by the wheel. The ramp may be mounted to the outer bracket and rotates in unison with the breakaway boom segment.

According to another aspect of the invention, the lift plate may include a lift plate trough adjacent the ramp. The lift plate trough may define a space that receives and holds the wheel or other deflector when the breakaway boom segment is in the neutral position. During a breakaway event, the trough advances past the wheel so the wheel engages the ramp. Further movement of the lift plate during the breakaway event forces the ramp to climb up and over the wheel, which rolls under the ramp and allows the ramp to be lifted by the wheel.

According to another aspect of the invention, the ramp is defined by a lobe of the lift plate that angles downwardly. The lobe may angle downwardly from the outer bracket with the ramp's outer portion arranged lower than its inner portion. The ramp and lift plate can move axially along the pivot axis so they lift along the pivot axis as the ramp advances across/over the deflector.

According to another aspect of the invention, the staged release mechanism holds the breakaway boom segment at the neutral position with a positive locking force that is greater than at least a portion of its neutral-return biasing force after the breakaway boom segment has moved out of the neutral position.

According to another aspect of the invention, the staged release mechanism provides an initial release stage. In the initial release stage, the stage release mechanism holds the breakaway boom segment in the neutral position until it experiences an initial release force that is greater than its neutral holding force, at which point the breakaway boom segment moves away from its neutral position. A continued breakaway stage of the staged release mechanism is defined by the staged release mechanism resisting at least some further movement of the breakaway boom segment with a restorative force that is less than the initial release force. Further movement of the breakaway boom segment during at least part of the continued breakaway stage is easier than initial movement of the breakaway boom segment from the neutral position. This facilitates at least some relatively easy movement of the breakaway boom segment after the initial release of the breakaway boom segment from the neutral position. In the continued breakaway stage, the stage release mechanism may define a variable restorative force that provides an increasing restorative force as the breakaway boom segment moves increasingly farther from the neutral position.

According to another aspect of the invention, the staged release mechanism may include a spring that biases the lift plate downwardly to provide a restorative force. The restorative force from the spring may return the breakaway boom segment to the neutral position and provide increasing resistance to further movement of the breakaway boom segment as the breakaway boom segment moves farther from the neutral position, which may correspond to a height change of the lift plate within the breakaway hinge assembly.

According to another aspect of the invention, an agricultural sprayer is provided that has a chassis and a sprayer boom supported by the chassis. The sprayer boom selectively delivers product to an agricultural field and includes a breakaway boom segment that can pivot with respect to the rest of the boom during a breakaway event. A forced lift mechanism cooperates with the breakaway hinge assembly. The forced lift mechanism is configured to guide the breakaway boom segment to raise with respect to the remainder of the sprayer boom during the breakaway event. A breakaway hinge assembly may be configured to guide the breakaway boom segment to pivot along a movement path at an angle that is both angularly rearward and angularly upward during the breakaway event.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
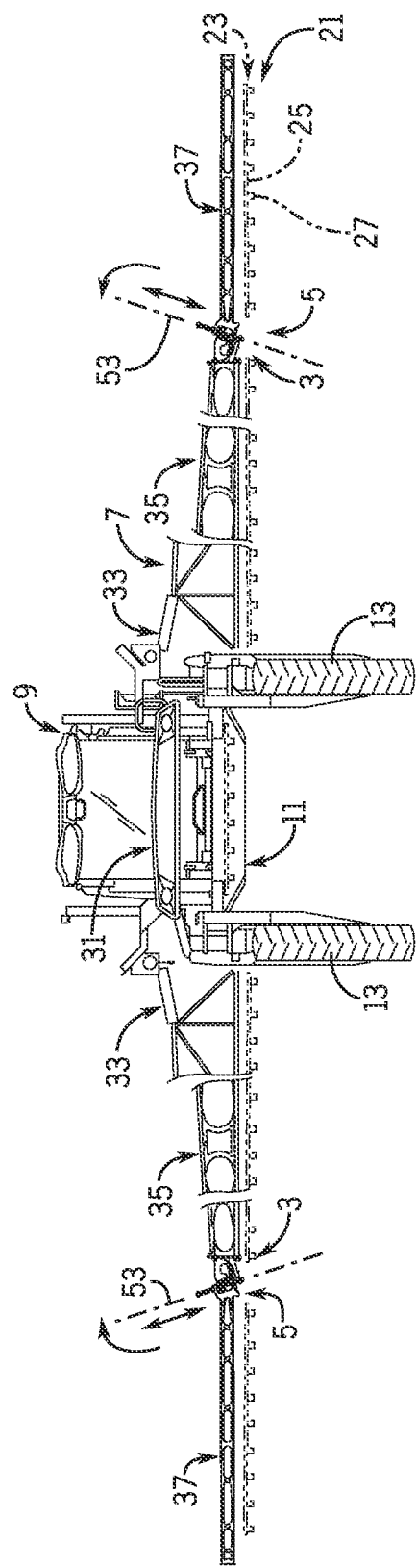
FIG. 1 is a front elevation of a self-propelled sprayer with a breakaway joint with a staged release and forced lift system according to the present invention.

Referring now to the drawings and specifically to FIG. 1, a sprayer boom breakaway joint 3 with a staged release and forced lift system, shown as system 5, is incorporated with boom 7 of an agricultural sprayer, shown here as a self-propelled agricultural sprayer vehicle or self-propelled sprayer 9. Although sprayer 9 is shown as a front-mounted boom self-propelled sprayer, it is understood that self-propelled versions of sprayer 9 can have either front-mounted or rear-mounted booms, such as those available from CNH Industrial, including the Miller Nitro and Condor Series sprayers and New Holland Guardian Series sprayers.

Still referring to FIG. 1, sprayer 9 includes chassis 11 having a chassis frame that supports various assemblies, systems, and components. These various assemblies, systems, and components include a cab, engine, and hydraulic system. The hydraulic system receives power from the engine to provide hydraulic pressure for operating hydraulic components within the sprayer 9 including, e.g., propel and steering systems for rotating and steering the wheels 13 of the sprayer 9.

Still referring to FIG. 1, spray system 21 includes storage containers such as a rinse tank that stores water or a rinsing solution, and a product tank that stores a volume of product for delivery onto an agricultural field. The product includes any of a variety of agricultural liquid products, such as various pesticides, herbicides, fungicides, liquid fertilizers, and other liquids including liquid suspensions beneficial for application onto agricultural fields. A product delivery pump of spray system 21 conveys product from the product tank through plumbing components, such as interconnected pieces of tubing, and through a wet boom system 23 with interconnected tubes or pipes 25 that are supported by boom 7. Nozzles 27 are spaced from each other and mounted to the wet boom system's pipes 25 to deliver product during spraying operations of sprayer 9.

Still referring to FIG. 1, boom 7 is connected to chassis 11 with lift arms that move the boom 7 up and down for adjusting the height of application of the product. Multiple boom segments are defined, with a boom center section 31 connected to the chassis through the lift arms. The boom's 7 left and right boom arms extend from boom center section 31. At each of the left and right boom arms, a main or primary boom segment 33, an intermediate or secondary boom segment 35, and a breakaway boom segment 37 sequentially extend from the boom center section 31. Hinge joints interconnect outer ends of the center section 31 with inner ends of the primary boom segments 33 and outer ends of the primary boom segments 33 with inner ends of the secondary boom segments 35 to allow the left and right boom arms to fold inwardly and achieve a transport mode of the sprayer 9. Breakaway joint 3 interconnects outer ends of secondary boom segments 35 with inner ends of breakaway boom segment 37.

Still referring to FIG. 1, within the breakaway joint 3, the system 5 is configured to positively lock breakaway boom segment 37 in a stable neutral position, for example, with the breakaway boom segment 37 extending linearly from the secondary boom segment 35 in a default state when the breakaway boom segment 37 is not experiencing a breakaway event. System 5 guides movement of breakaway boom segment 37 to simultaneously raise or lift while deflecting rearwardly.

Figure 2:
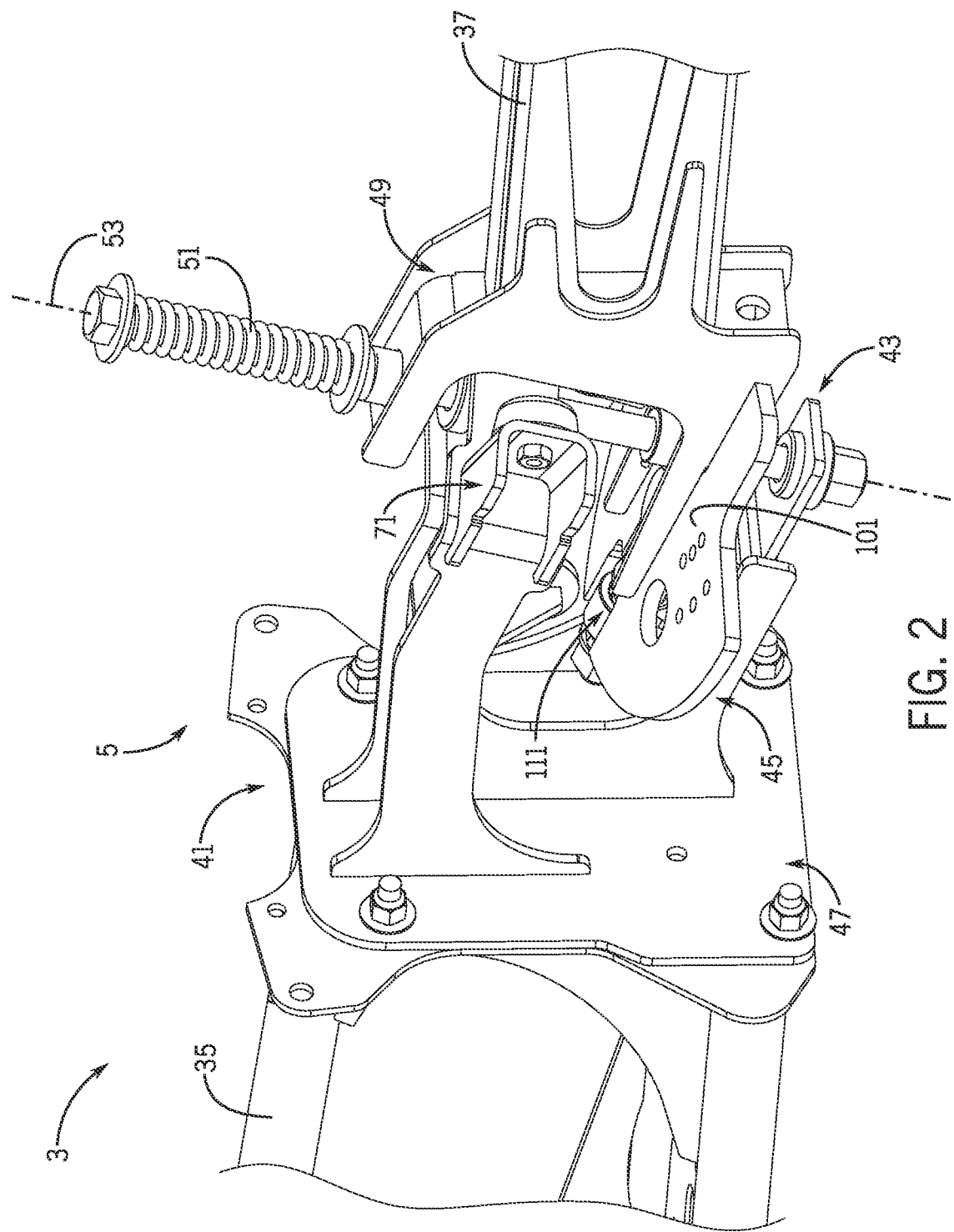
FIG. 2 is an isometric view of the breakaway joint of FIG. 1.

Referring now to FIG. 2, system 5 includes a breakaway hinge assembly 41 that guides movement of breakaway boom segment 37, staged release mechanism 43 that holds breakaway boom segment 37 in the neutral position and controls the resistance to movement away from the neutral position, and forced lift mechanism 45 that lifts the breakaway boom segment 37 linearly while it pivots during a breakaway event. Breakaway hinge assembly 41 includes inner bracket 47 connected to a first boom segment, shown here as the outer end of secondary boom segment 35. Outer bracket 49 is connected to a second boom segment, shown here as the inner end of breakaway boom segment 37. Hinge pin 51 connects the inner and outer brackets 47, 49 to each other and defines a pivot axis 53 about which the breakaway boom segment 37 pivots.

Figure 3:
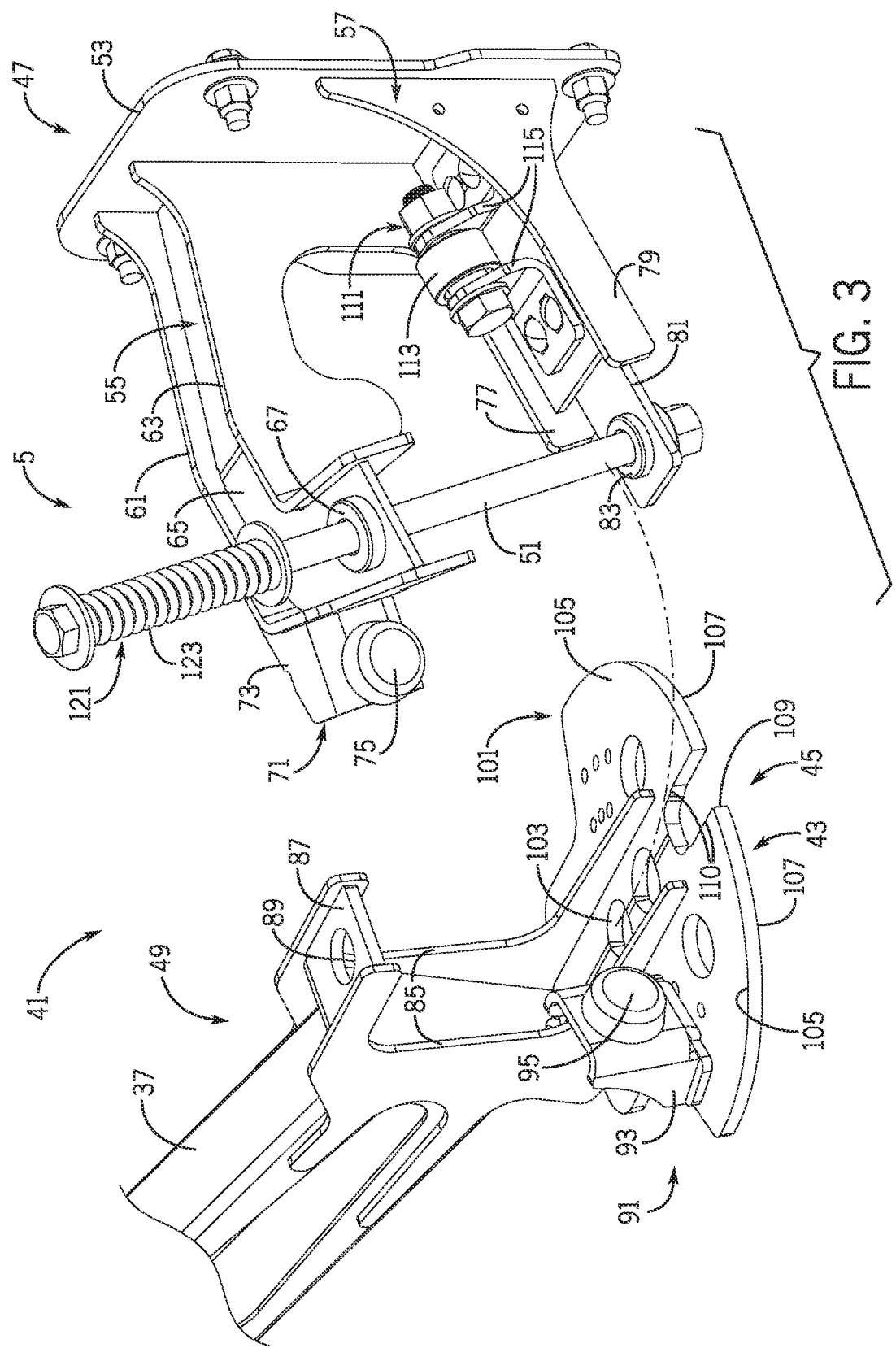
FIG. 3 is an exploded view of the breakaway joint of FIG. 2.

Referring now to FIG. 3, inner bracket 47 is shown as a weldment that includes back plate 53 that engages a plate at the outer end of secondary boom segment 35 (FIG. 2). Upper and lower bracket arms 55, 57 extend perpendicularly from back plate 53 and are shown offset with respect to each other and with upper bracket arm 55 and extending outwardly farther than lower bracket arm 57. Each of the upper and lower bracket arms 55, 57 are shown formed from multiple webs of material that are attached to each other. Upper bracket arm 55 includes outer and inner walls 61, 63 that are connected by a transverse shelf 65, with inner wall 63 shown extending further down than inner wall 61, to a lower portion of back plate 53. Upper bracket arm 55 defines an L-shaped configuration when viewed from above, with an outer segment that extends angularly from the remainder of the upper bracket arm 55. Hinge pin 51 extends through a bore 67 at the upper bracket arm 55 outer segment. Inner bracket stop assembly 71 includes a stop bracket 73 attached to the upper bracket arm 55 outer segment and has a knob or bump stop 75 mounted to stop bracket 73. Inner bracket stop assembly 71 is configured to prevent further travel of breakaway boom segment 37 in its forward direction by engaging and preventing further travel of outer bracket 49 and further over-pivoting forward or unfolding of the breakaway boom segment 37. The upper arm inner wall 63 is generally C-shaped in profile and its lower portion defines an inner wall 77 lower bracket arm 57. Lower bracket arm outer wall 79 is spaced from inner wall 77 and connected to it with transverse shelf 81. A lower end of hinge pin 51 extends through a bore 83 of shelf 81.

Still referring to FIG. 3, outer bracket 49 is shown as a weldment that includes a pair of spaced apart walls 85 that are connected to each other with a transverse shelf 87. Each wall 85 has a side that is generally C-shaped facing toward the inner bracket 47 and fingers at another side that extend in an opposite direction of the C-shaped side and lie over and are connected to the inner end of breakaway boom segment 37. Toward the top of the outer bracket, hinge pin 51 extends through a bore 89 of shelf 87. Outer bracket stop assembly 91 includes a stop bracket 93 attached or fixed with respect to a lower portion of the outer bracket 49 and has a knob or bump stop 95 mounted to stop bracket 93. Outer bracket stop assembly 91 is configured to prevent further travel of breakaway boom segment 37 in the rearward breakaway direction by engaging the inner bracket 47 and preventing further travel of outer bracket 49 and breakaway boom segment 37.

Still referring to FIG. 3, staged release mechanism 43 and forced lift mechanism 45 are shown here sharing various common components within system 5. Staged release mechanism 43 is shown configured to positively and mechanically lock the breakaway boom segment 37 in its neutral position during normal operation or when the breakaway boom segment 37 is not experiencing a breakaway event. Staged release mechanism 43 is further shown to provide a variable breakaway resistance or variable restorative force. At least initially after releasing from its neutral position, breakaway boom segment 37 may experience a lesser holding force that biases it toward the neutral position than the neutral holding force, allowing for relatively low resistance breakaway movement for at least part of the breakaway movement immediately after release from its neutral position. Forced lift mechanism 45 cooperates with breakaway boom segment 37 to lift it with a vertical movement component along with its rearward movement during breakaway events to reduce the likelihood of plowing or dragging across the crops or ground.

Still referring to FIG. 3, staged release and forced lift mechanisms 43, 45 include a lift plate 101, shown here mounted to a bottom end of outer bracket 49 and supporting the outer bracket stop assembly 91 from below. Bore 103 extends through lift plate 101 and is aligned with outer bracket bore 89 to receive a lower end of hinge pin 51. Lift plate 101 is shown with a pair of symmetrical lobes 105 that extend transversely in opposite directions beyond both sides of outer bracket 49. Lobes 105 extend longitudinally beyond outer bracket 49 to interact with various components mounted to inner bracket 47. The lobes 105 slope downwardly away from each other from a line of intersection that aligns with a centerline of outer bracket 49 to give the lift plate 101 an upside-down V shape when viewed from an end view. The angled lobes 105 define ramps 107 that present ramped surfaces of the downwardly facing surfaces of the lobes 105. A pocket or void, shown as a lift plate trough or trough 109, extends into an outer perimeter edge of the lift plate 101 and is transversely bounded between two edges 110 of the trough 109.

Still referring to FIG. 3, deflector 111 is mounted to inner bracket 47 and configured to cooperate with lift plate 101 to control movement of breakaway boom segment 37 through interactions in the staged released and forced lift mechanisms 43, 45, including positively locking breakaway boom segment 37 in the neutral position and controlling its lift characteristics while pivoting during a breakaway event. Deflector 111 is shown here with wheel 113 supported between a pair of brackets 115 that are connected to transverse shelf 81 of the inner bracket's 47 lower bracket arm 57. Wheel 113 has an axis of rotation that is generally perpendicular to hinge pin 51 and is positioned so that when the breakaway boom segment 37 is in the neutral position, wheel 113 nests within trough 109. During a breakaway event, the breakaway movement of the pivoting breakaway boom segment 37 forces the ramps 107 of lift plate 101 to advance across wheel 113, with movement of breakaway boom segment 37 limited in either direction by the inner and outer bracket stop assemblies 71, 91. During movement of the breakaway boom segment 37, the advancement of ramps 107 over wheel 113 provides an uphill spiraling climb effect that pushes lift plate 101 upwardly while the outer bracket 49 pivots away from the neutral position about hinge pin 51. A biasing member 121, shown here as spring 123 that is sandwiched between washers, urges lift plate 101 downwardly in opposition to the breakaway force by pushing against transverse shelf 87 of outer bracket 49 to provide a downhill spiraling climb effect as a restorative force that urges outer bracket 49 and breakaway boom segment 37 back toward the neutral position.

Figure 4:
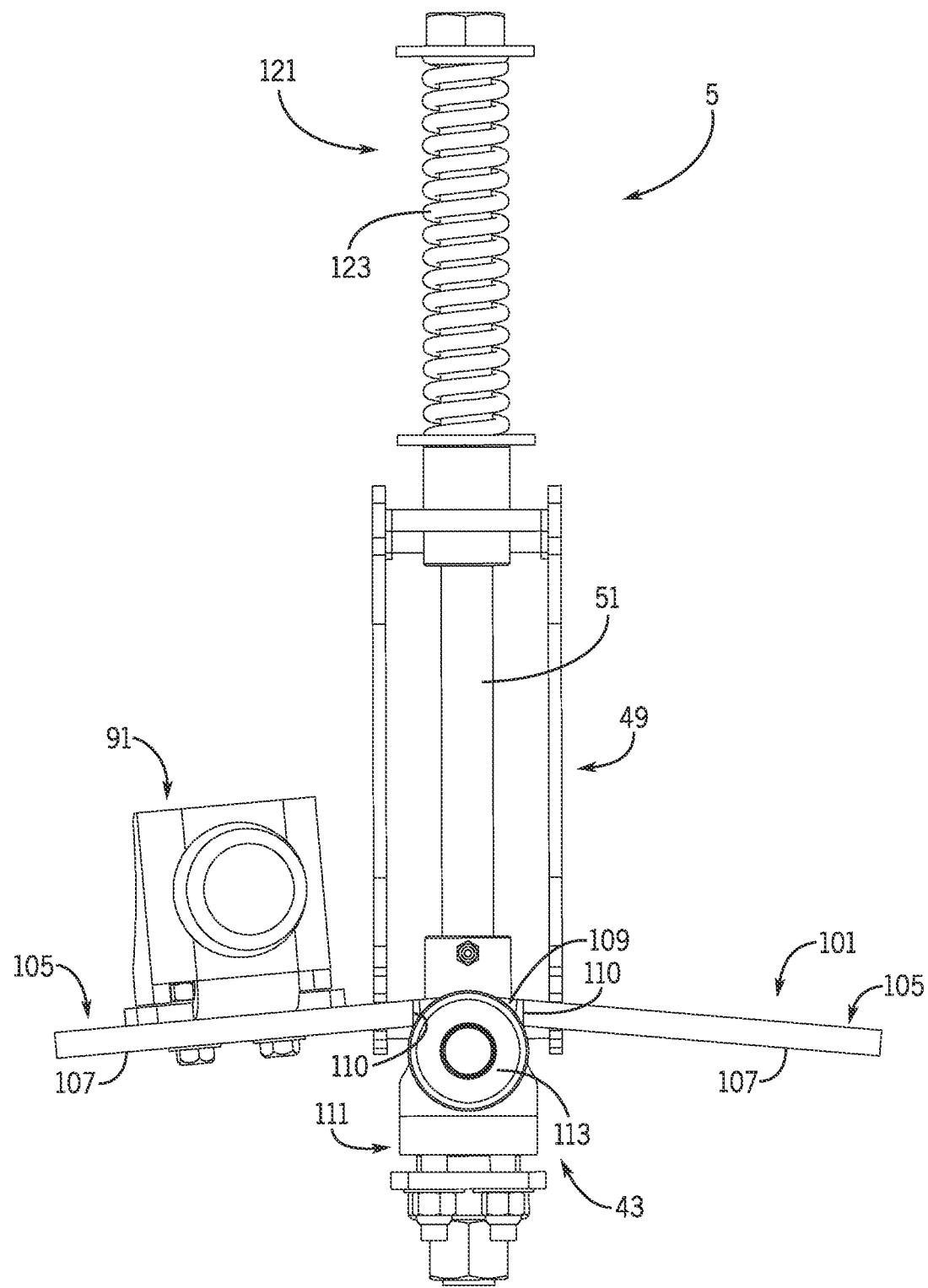
FIG. 4 is an end view of portions of the breakaway joint of FIG. 2 with a breakaway boom segment in a first, neutral, position.

Referring now to FIG. 4, when the breakaway boom segment 37 is in the neutral position, system 5 positively locks the breakaway boom segment 37 in the neutral position by mechanical engagement of lift plate 101 and wheel 113 or other deflector 111. As shown here, wheel 113 is captured between and engages both trough edges 110 with its outer circumferential surface within the upper half of the wheel 113. The point of engagement(s) between wheel 113 and trough edges 110 is shown here as approximately at the top one-quarter of the height or diameter of wheel 113, with the upper surface of wheel 113 extending through trough 109, upwardly beyond an upper surface of lift plate 101. This transversely captured arrangement of the wheel 113 within trough 109 provides a neutral holding force. System 5 defines an initial release stage through the staged release mechanism 43 that corresponds to holding the lift plate against the wheel 113 with the neutral holding force until the staged release mechanism 43 experiences an initial release force that is greater than the neutral holding force and moves the breakaway boom segment 37 away from the neutral position. The initial release force corresponds to the amount of force required to push the trough edge 110 to climb up and over wheel 113, apply a torque to rotate wheel 113, or overcome a frictional force and slide across wheel 113, which simultaneously raises the lift plate 101, outer bracket 49, and breakaway boom segment 37, as they pivot about hinge pin 51 while overcoming the downwardly biasing force of spring 123.

Figure 5:
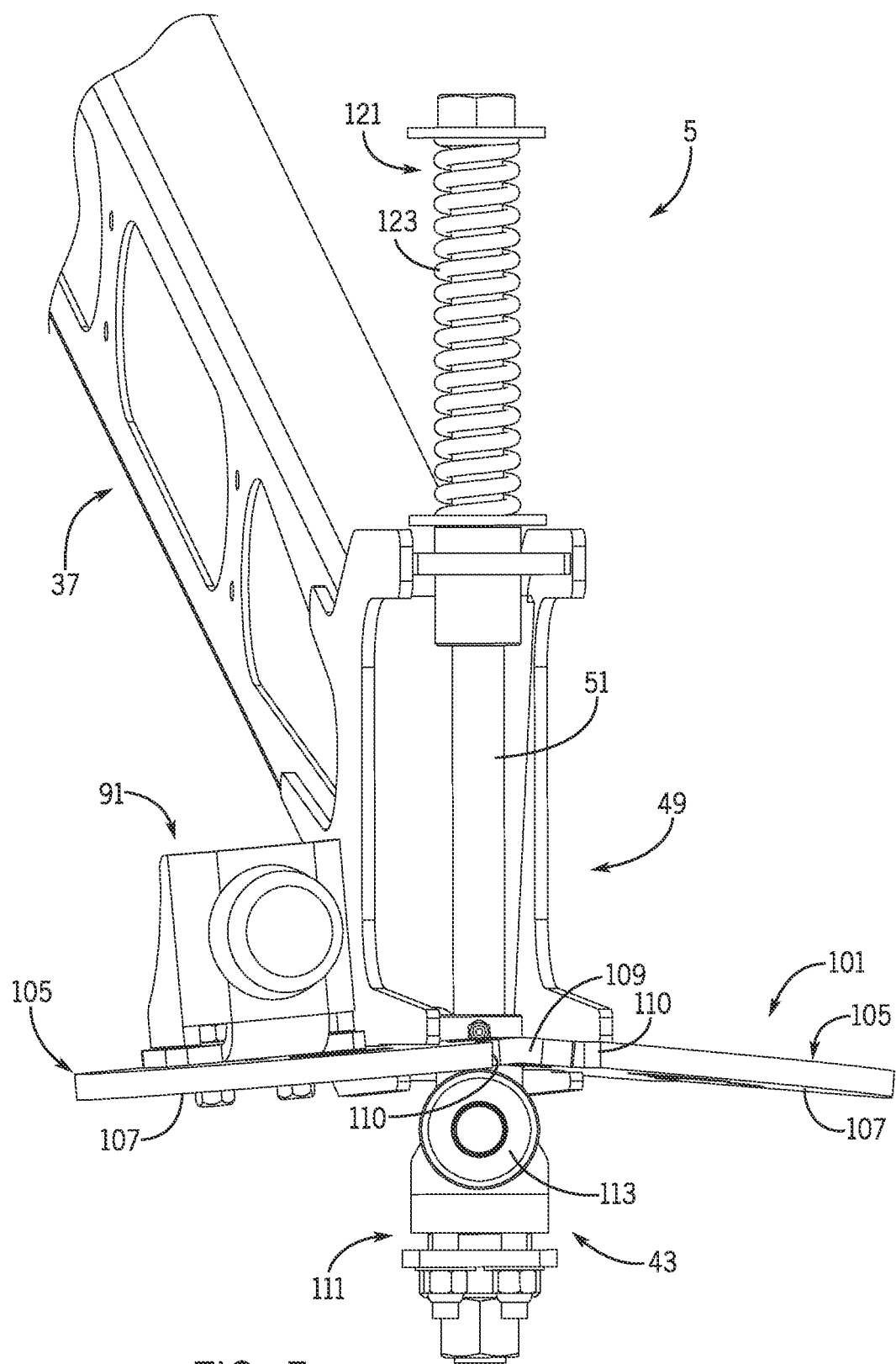
FIG. 5 is an end breakaway boom segment in a second position.

Referring now to FIG. 5, after the initial release force releases breakaway boom segment 37 from being positively locked by the neutral holding force of the engaged wheel 113 and trough 109 during the initial release stage, the system 5 defines a continued release stage. Initially during the continued breakaway stage, the lift plate 101 is rotated far enough to advance trough 109 beyond its engagement with wheel 113. A portion of ramps 107 that is closest to trough 109 sits on top of wheel 113 at the initiation of the continued breakaway stage. From this starting position of the continued breakaway stage, at least some of the additional pivot motion of outer bracket 49 toward a full breakaway position requires less effort than the initial release force required to move the breakaway boom segment 37 away from the neutral position. As shown here, the breakaway boom segment 37 experiences variable breakaway resistance or variable restorative force because further rotation requires lower portions of the angled ramp 107 to advance over wheel 113, which lifts outer bracket 49 and further compresses spring 123 to increase the breakaway resistance as the breakaway boom segment 37 rotates further.

Figure 6:
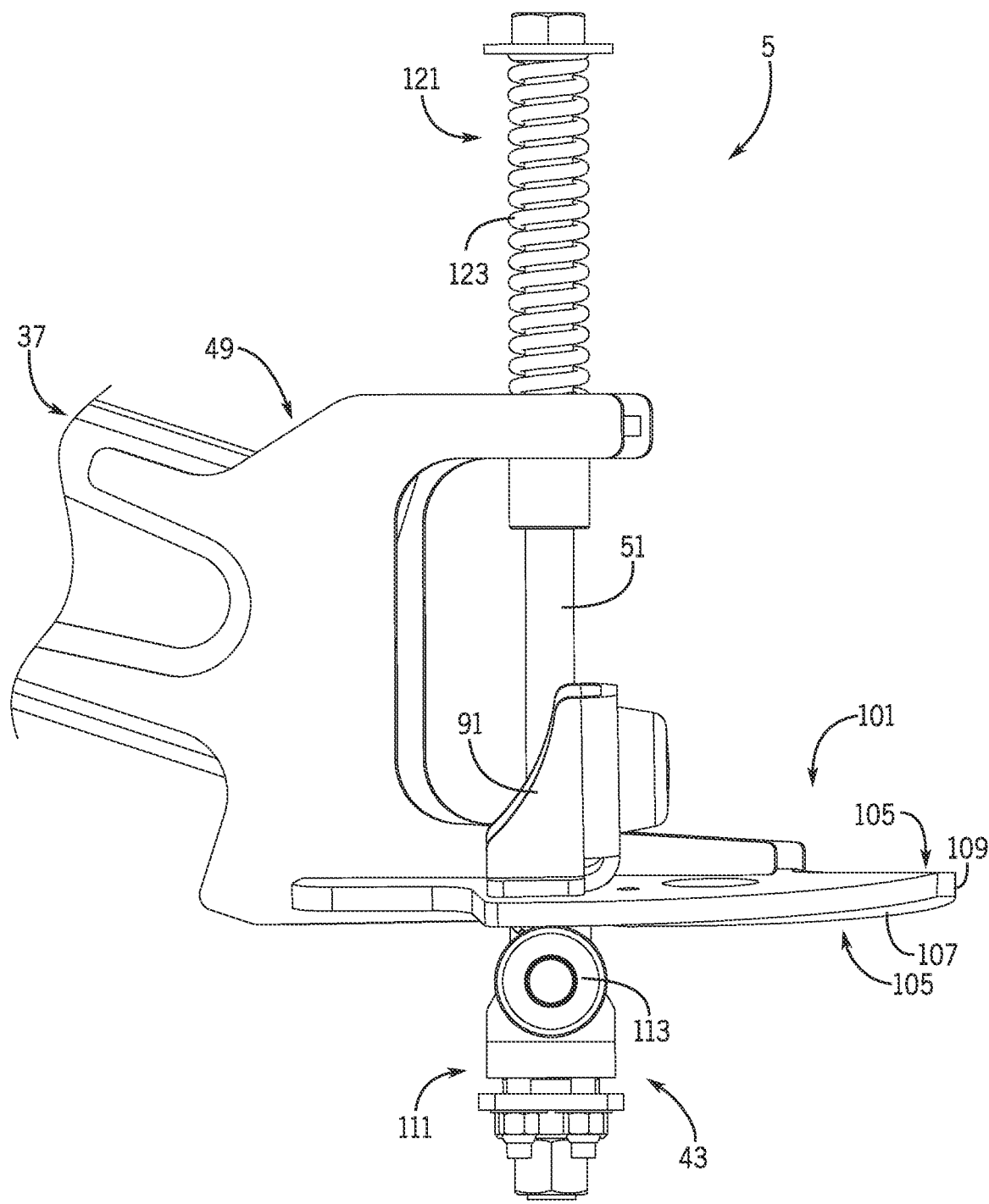
FIG. 6 is an end view of portions of the breakaway joint of FIG. 2 with the breakaway boom segment in third position toward the end of a breakaway event.

Referring now to FIG. 6, toward the end of the continued breakaway stage, the outer bracket 49 is pivoted farthest from the neutral position, for example, far enough so that outer bracket stop assembly 91 engages the inner bracket 47 (FIG. 3), preventing further rotation. The lowest point of ramp 107 sits on top of wheel 113, which raises the outer bracket 49 and breakaway boom segment 37 to their highest position relative to hinge pin 51, compressing spring 123 yet farther, for example, to the maximum amount permitted by the actuating components of system 5.

Referring generally to FIGS. 4-6, the height change of lift plate 101 between the neutral position of FIG. 4 and the end of the initial release stage/beginning of the continued breakaway stage of FIG. 5 may be approximately the same or greater than the height change of lift plate 101 between the beginning of the continued breakaway stage of FIG. 5 and the end of the continued breakaway stage of FIG. 6. However, the height change of lift plate 101 between the neutral position of FIG. 4 and the end of the initial release stage/beginning of the continued breakaway stage of FIG. 5 occurs during a substantially smaller angular rotation of the lift plate 101 about hinge pin 51 that is required to raise the lift plate 101 the rest of the way to the full break away position shown in FIG. 6. Accordingly, a ratio of lift height to rotation distance is greater for the initial release stage (compare FIGS. 4 and 5) than that of the continued breakaway stage (compare FIGS. 5 and 6).

Figure 7:
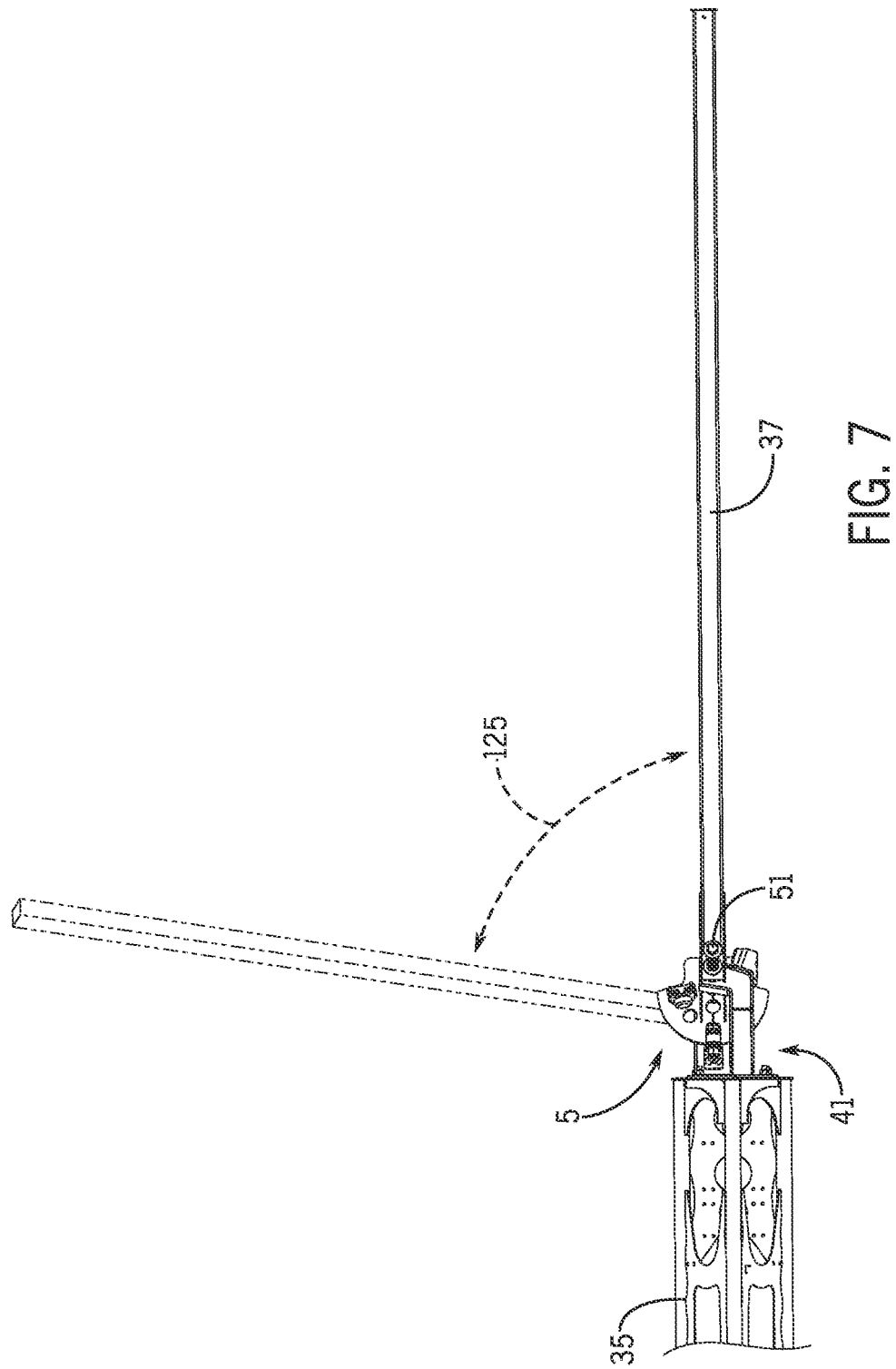
FIG. 7 is a top plan view of a portion of the boom and the breakaway joint of FIG. 1.
Figure 8:
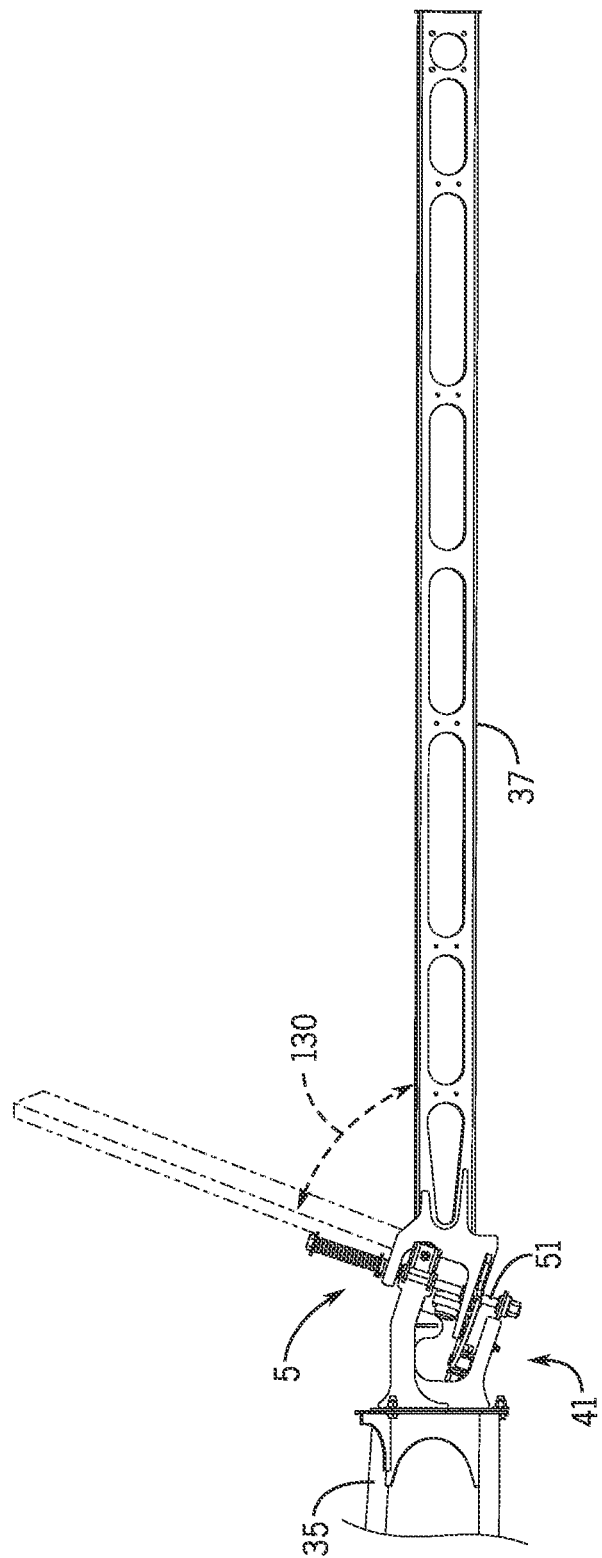
FIG. 8 is a front elevation view of a portion of the boom and the breakaway joint of FIG. 1.
Figure 9:
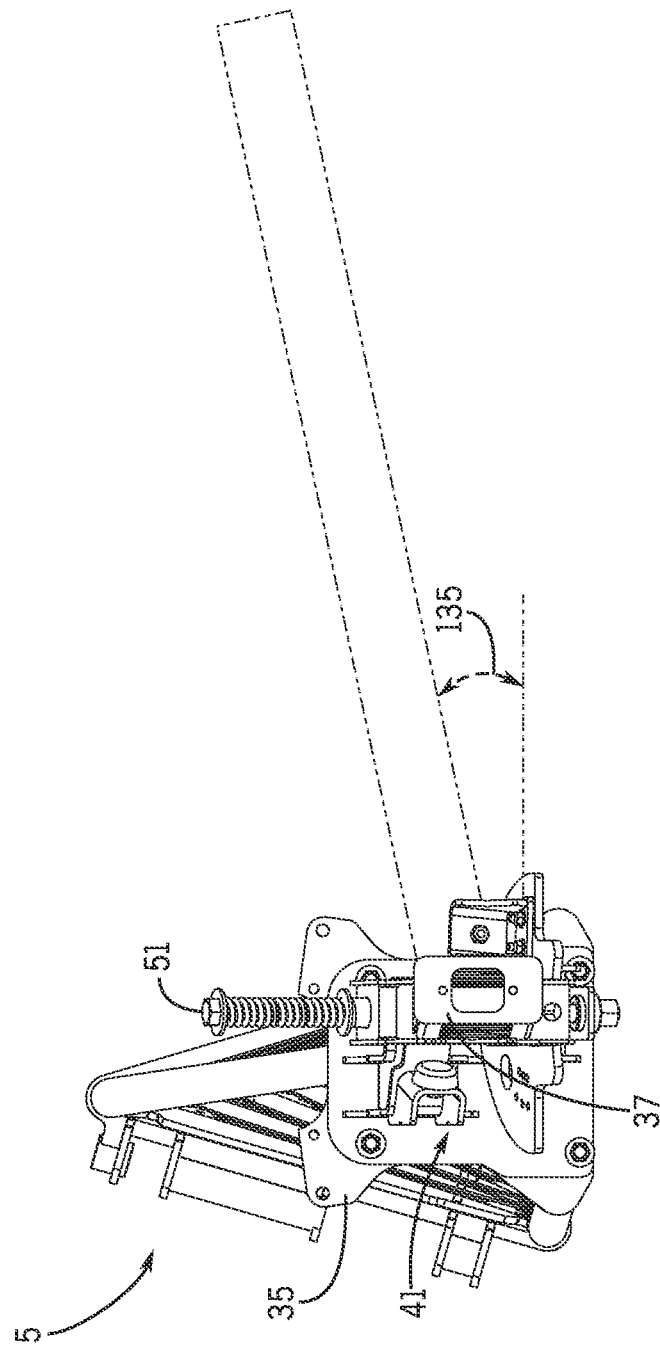
FIG. 9 is an end view of a portion of the boom and the breakaway joint of FIG. 1.

FIGS. 7-9 show pivot travel paths of breakaway boom segment 37 about hinge pin 51 during a breakaway event from different angles, while it is understood that breakaway boom segment 37 may simultaneously raise axially along hinge pin 51 by way of forced lift mechanism 45 (FIG. 3), such as the interactions of ramps 107 (FIG. 3) and wheel 113 (FIG. 3). Referring now to FIG. 7, when viewed from above, breakaway boom segment 37 defines a horizontal range of motion of between about 70° and 90°, for example, about 80° plus or minus ten percent. Horizontal pivot movement represented by the dashed arc 125 shows movement of breakaway boom segment 37 from the neutral position, shown in solid line, to a full breakaway position shown in dashed lines.

Referring now to FIG. 8, when viewed from in front, breakaway boom segment 37 defines a vertical range of motion of between about 45° and 70°, for example, about 57° plus or minus ten percent. Vertical pivot movement represented by the dashed arc 130 shows movement of breakaway boom segment 37 from the neutral position, shown in solid line, to a full breakaway position shown in dashed lines. It is noted that even though breakaway boom segment 37 is substantially parallel to the ground and aligned with secondary boom segment 35 when in the neutral position, its rearward pivoting motion is accompanied by a vertical lifting component during the breakaway event. That is because hinge pin 51 is arranged at an angle with respect to the secondary and breakaway boom segments 35, 37. Hinge pin 51 is tilted outwardly with its upper end angles outwardly past its lower end.

Referring now to FIG. 9, when viewed from the outer end, breakaway boom segment 37 defines a vertical range of motion of between about 10° and 25°, for example, about 16° plus or minus ten percent. Vertical pivot movement represented by the dashed arc 135 shows movement of breakaway boom segment 37 from the neutral position, shown in solid line, to a full breakaway position shown in dashed lines. Like the vertical motion viewed from in front of breakaway boom segment 37 (FIG. 8), the angle of hinge pin 51 forces a vertical sweeping movement component along with the rearward pivoting component during the breakaway event. The vertical sweeping movement component that corresponds to the angle of hinge pin 51 can contribute to the variable restorative force of system 5 because an increasing force is required to pivot the breakaway boom segment 37 farther up, along with the increasing resistance provided by further compressing spring 123 (FIG. 3).

Many changes and modifications could be made to the invention without departing from the spirit thereof. The scope of these changes will become apparent from the appended claims.

We claim:

1. An agricultural sprayer, comprising:
a chassis;
a sprayer boom supported by the chassis and configured to deliver product to an agricultural field, the sprayer boom including a breakaway boom segment configured to pivot with respect to a first boom segment of the sprayer boom during a breakaway event about a pivot axis; and
a sprayer boom breakaway joint comprising:
an inner bracket connected to the first boom segment;
an outer bracket connected to the breakaway boom segment;
a lift plate extending transversely from the outer bracket, the lift plate defining a ramp that angles downwardly from the outer bracket so that an outer portion of the ramp is lower than an inner portion of the ramp relative to the outer bracket, the lift plate moving in unison with the breakaway boom segment, a portion of the lift plate defining the ramp moving in unison with the breakaway boom segment;

a deflector coupled to the inner bracket, the deflector engaging the ramp during the breakaway event to lift the lift plate, the outer bracket, and the breakaway boom segment while the breakaway boom segment pivots with respect to the first boom segment during the breakaway event; and
a spring that provides a restorative force that biases the lift plate to return the breakaway boom segment to the neutral position, the restorative force increases as the breakaway boom segment moves farther from the neutral position to resist further movement of the breakaway boom segment from the neutral position,
wherein the breakaway boom segment is held in a neutral position by the sprayer boom breakaway joint before the breakaway event.

2. The agricultural sprayer of claim 1, wherein the breakaway boom segment is pivotable relative to the first boom segment along a movement path during the breakaway event at an angle that is both:
angularly rearward with respect to the first boom segment; and
angularly upward with respect to the first boom segment.

3. The agricultural sprayer of claim 1, wherein the deflector engages the ramp during the breakaway event such that the breakaway boom segment is lifted progressively upwardly as the breakaway boom segment moves farther from the neutral position.

4. The agricultural sprayer of claim 1, wherein the lift plate further defines a trough that is configured to receive and hold the deflector when the breakaway boom segment is in the neutral position to maintain the breakaway boom segment in the neutral position until an initial release force disengages the trough from the deflector.

5. The agricultural sprayer of claim 1, wherein the restorative force is a function of a height of the lift plate relative to the inner bracket.

6. An agricultural sprayer, comprising:
a chassis;
a sprayer boom supported by the chassis and configured to deliver product to an agricultural field, the sprayer boom including a boom center section, a first boom segment pivotably coupled to the boom center section, and a breakaway boom segment configured to pivot about a pivot axis with respect to a first boom segment of the sprayer boom during a breakaway event;
a lift plate mounted to pivot in unison with the breakaway boom segment the lift plate extending generally in a horizontal direction, the lift plate defining a ramp that angles downwardly, a portion of the lift plate defining the ramp moving in unison with the breakaway boom segment; and
a deflector that engages the lift plate during the breakaway event to lift the breakaway boom segment while the breakaway boom segment pivots away from a neutral position, the ramp engaging the deflector to move the lift plate upwardly as the breakaway boom segment moves farther from the neutral position, the deflector being held by the lift plate before the breakaway event to maintain the breakaway boom segment in the neutral position until an initial release force is applied that disengages the lift plate and the deflector from each other.

7. The agricultural sprayer of claim 6, further comprising a biasing member that biases the lift plate downwardly to return the breakaway boom segment to the neutral position.

\* \* \* \* \*